(12) United States Patent
Cho

(10) Patent No.: US 11,971,738 B2
(45) Date of Patent: Apr. 30, 2024

(54) USER INTERFACE DEVICE WITH ADJUSTABLE KNOB HOLDING FORCE

(71) Applicant: SEOYON E-HWA CO., LTD., Anyang (KR)

(72) Inventor: Ju Hwan Cho, Incheon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 0 days.

(21) Appl. No.: 17/820,208

(22) Filed: Aug. 16, 2022

(65) Prior Publication Data

US 2023/0138312 A1 May 4, 2023

(30) Foreign Application Priority Data

Oct. 29, 2021 (KR) .................. 10-2021-0146552

(51) Int. Cl.
| | |
|---|---|
| *G05G 5/06* | (2006.01) |
| *B60K 35/10* | (2024.01) |
| *G05G 1/08* | (2006.01) |
| *G05G 5/03* | (2008.04) |
| *H01H 19/14* | (2006.01) |

(52) U.S. Cl.
CPC .............. *G05G 5/06* (2013.01); *B60K 35/10* (2024.01); *G05G 5/03* (2013.01); *B60K 2360/126* (2024.01); *G05G 1/08* (2013.01); *G05G 2505/00* (2013.01); *H01H 19/14* (2013.01)

(58) Field of Classification Search
CPC .. G05G 1/08; G05G 1/10; G05G 5/03; G05G 5/06; G05G 2505/00; H01H 19/14; B60K 35/10; B60K 2360/126
See application file for complete search history.

(56) References Cited

U.S. PATENT DOCUMENTS

| | | | |
|---|---|---|---|
| 10,234,968 B2 * | 3/2019 | Brown | G06F 3/0362 |
| 11,775,089 B2 * | 10/2023 | Cho | B60K 35/10 |
| | | | 345/184 |

(Continued)

FOREIGN PATENT DOCUMENTS

| | | |
|---|---|---|
| JP | 6098438 B2 | 3/2017 |
| KR | 0138779 Y1 * | 4/1999 |

(Continued)

OTHER PUBLICATIONS

KR OA dated Dec. 14, 2021.
KR Grant dated Feb. 25, 2022.

*Primary Examiner* — Adam D Rogers
(74) *Attorney, Agent, or Firm* — Harvest IP Law, LLP

(57) ABSTRACT

Disclosed herein a user interface device includes a rail extending in a first direction; a hinge configured to slide along the rail; a knob coupled to the hinge to slide and configured to detect a rotation input; and a magnet holder disposed to face the hinge in a second direction of the hinge and extending in the first direction; wherein the hinge is provided with a first magnet, the magnet holder is provided with a second magnet and a third magnet, the second and third magnets have different magnetic poles from that of the first magnet on facing surface thereagainst, the first magnet reacts by an magnetic force of the second or third magnets so that the knob is held to a first position or a second position repectively, a strength of the magnetic force between the first magnet and the second or third magnets is adjustable.

9 Claims, 6 Drawing Sheets

(56) References Cited

U.S. PATENT DOCUMENTS

| | | | |
|---|---|---|---|
| 11,881,364 B2* | 1/2024 | Cho | B60R 16/005 |
| 2006/0258302 A1* | 11/2006 | Ding | H04M 1/0247 |
| | | | 455/90.3 |
| 2023/0134716 A1* | 5/2023 | Cho | G06F 1/1681 |
| | | | 345/184 |
| 2023/0135190 A1* | 5/2023 | Cho | G06F 3/0362 |
| | | | 200/564 |
| 2023/0136995 A1* | 5/2023 | Cho | B60K 37/06 |
| | | | 701/36 |

FOREIGN PATENT DOCUMENTS

| | | | |
|---|---|---|---|
| KR | 20-0354931 Y1 | | 7/2004 |
| KR | 20080066601 A | | 7/2008 |
| KR | 101094034 B1 | | 12/2011 |
| KR | 101152743 B1 | * | 6/2012 |
| KR | 101478294 B1 | | 12/2014 |
| KR | 20170129012 A | | 11/2017 |
| KR | 101955419 B1 | | 5/2019 |

* cited by examiner

[FIG. 1]
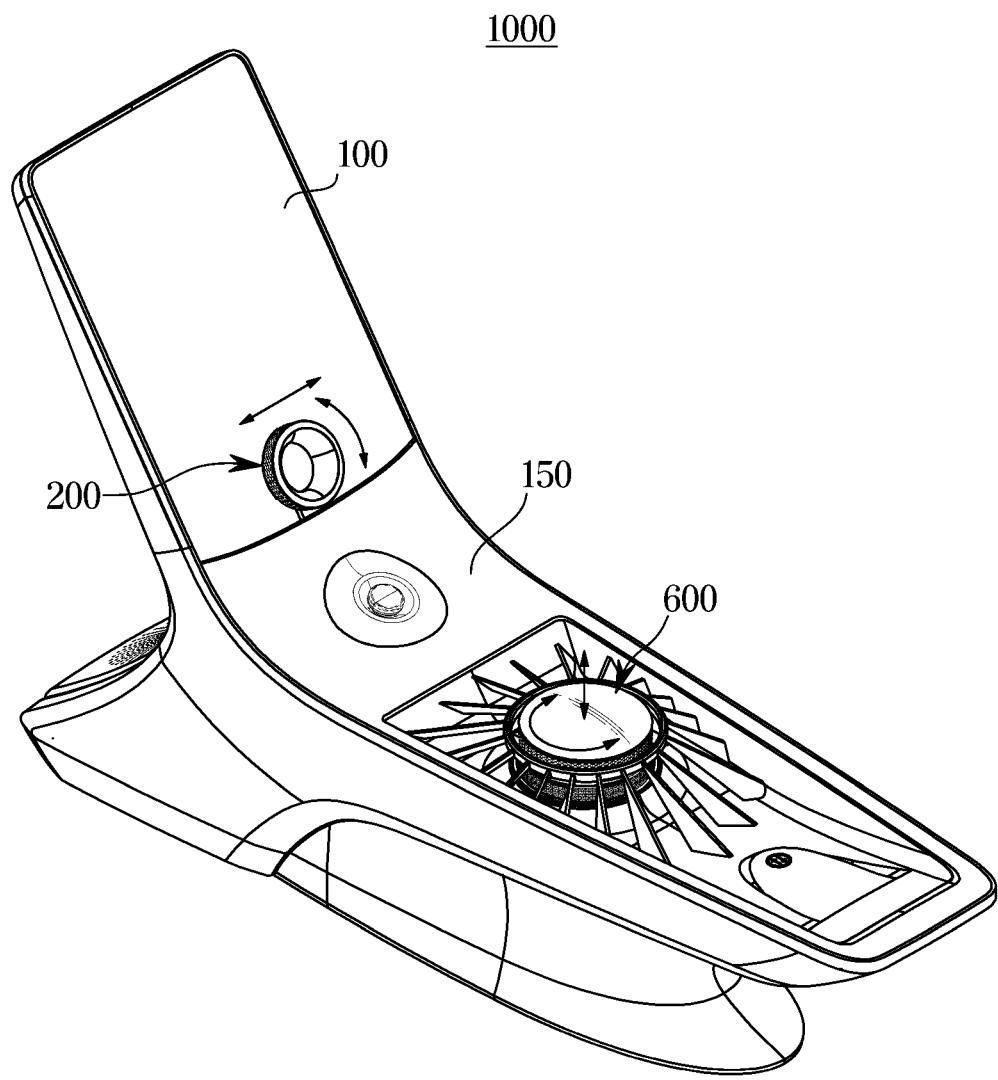

[FIG. 2]
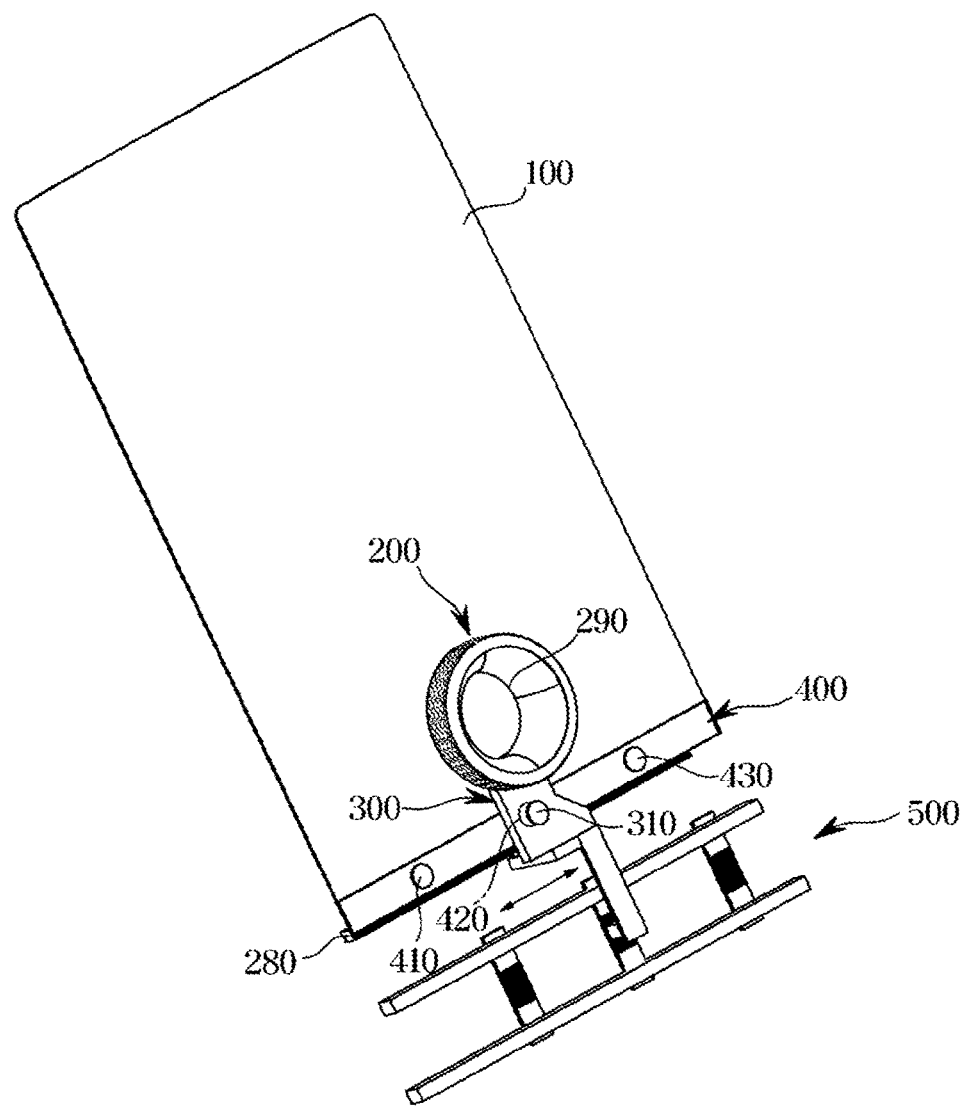

[FIG. 3]
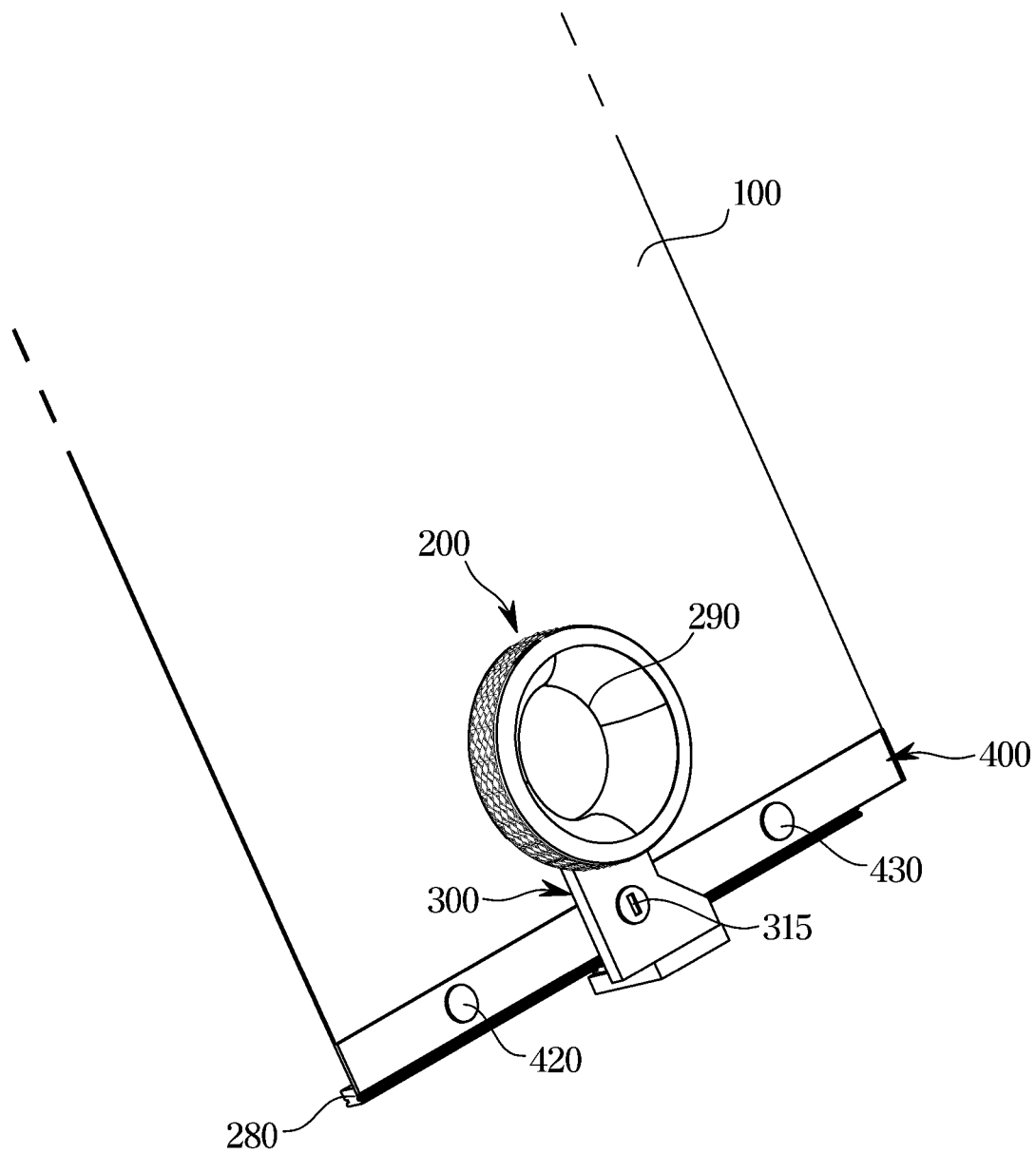

[FIG. 4]
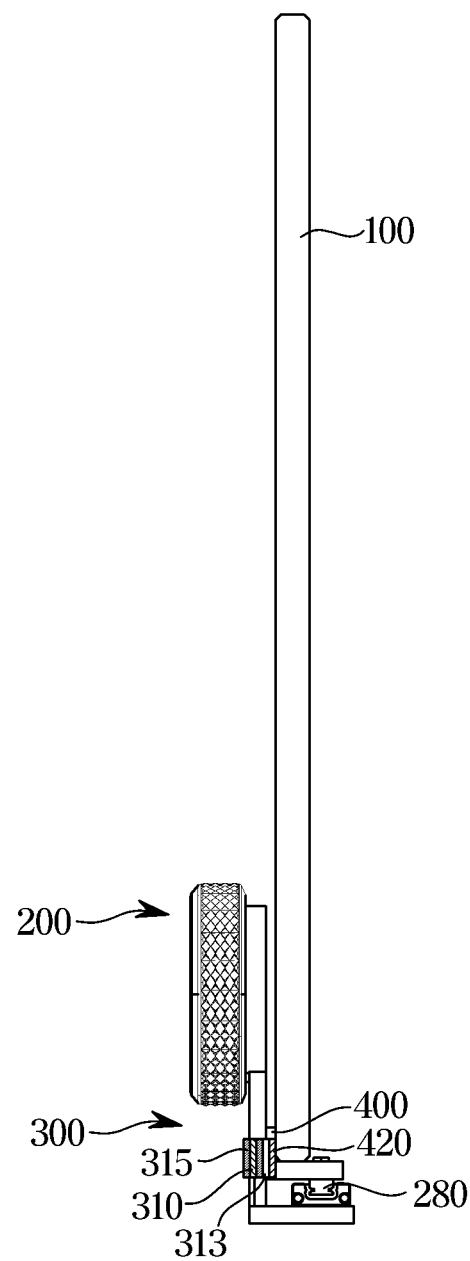

[FIG. 5]
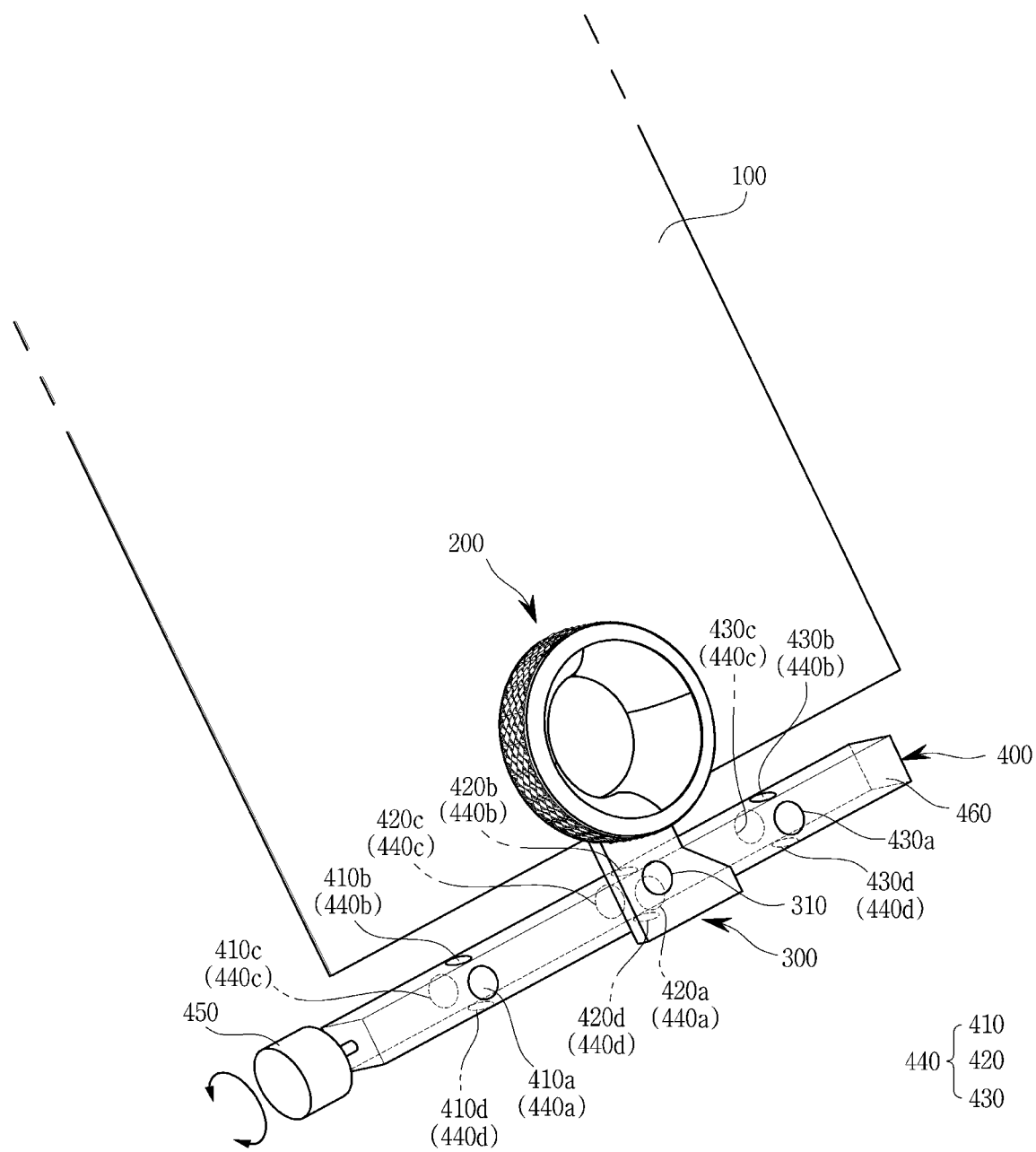

[FIG. 6]
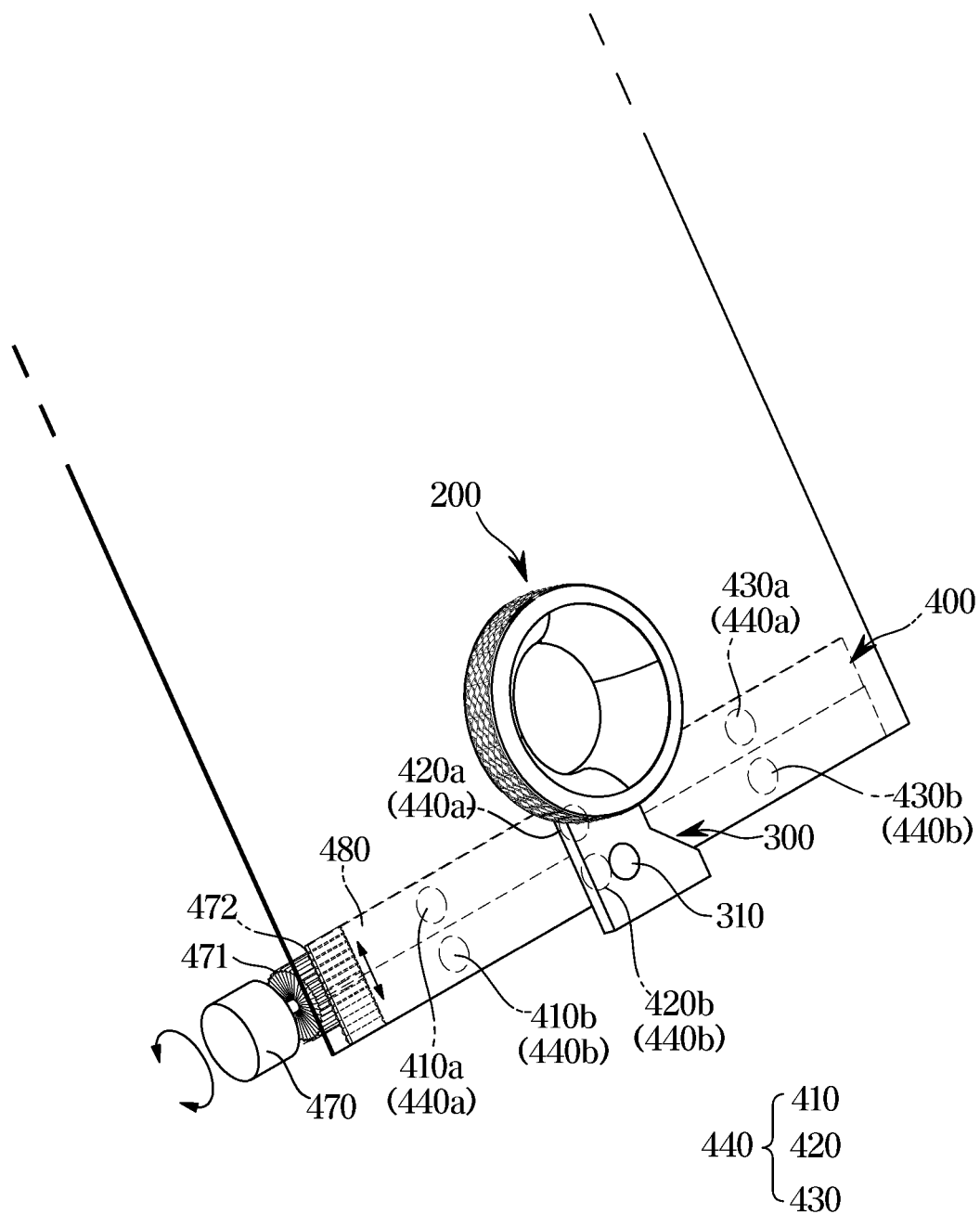

USER INTERFACE DEVICE WITH ADJUSTABLE KNOB HOLDING FORCE

CROSS-REFERENCE TO RELATED APPLICATION(S)

This application is based on and claims priority under 35 U.S.C. § 119 to Korean Patent Application No. 10-2021-0146552, filed on Oct. 29, 2021 in the Korean Intellectual Property Office, the disclosure of which is incorporated herein by reference in its entirety.

TECHNICAL FIELD

The disclosure relates to a user interface device with adjustable knob holding force, and more particularly, to a user interface device in which a holding force of a knob may be adjusted by adjusting a magnetic force of a magnet for holding a sliding knob at a specific position.

BACKGROUND

In general, vehicles have a center fascia, which is provided with various systems that may be controlled by a user. For example, such various systems provided in a center fascia of a vehicle include navigation, radio, and air conditioning control system, and the like. To control such various systems, an input device for receiving a user's input may be provided.

Meanwhile, an output device for outputting information from such various systems may be provided in a center fascia of a vehicle. Conventionally, simple output devices such as an indicator lamp are provided in order to output information, but nowadays, a large display may be used in order to output various information to a user as needed. Furthermore, by providing a touch input means in a large display device, a user may intuitively perform an input according to output contents.

Recently, as a device for manipulating in-vehicle devices, development of knob-on-display technologies that may provide driving environment information through a display and control in-vehicle systems through a physical manipulation method has been ongoing. A knob allows a driver to manipulate devices precisely without taking their eyes off a road, and enables intuitive and physical control through a moderate sense of resistance.

However, such a knob may detect only a simple rotation input, so study on a user interface device that allows a user to control a system through various inputs is required.

SUMMARY

An aspect of the disclosure is to provide a user interface device in which a holding force of a knob may be adjusted by adjusting a magnetic force of a magnet that holds a sliding knob at a predetermined position.

Additional aspects of the disclosure will be set forth in part in the description which follows and, in part, will be obvious from the description, or may be learned by practice of the disclosure.

In accordance with an aspect of the disclosure, a user interface device includes a rail extending in a first direction; a hinge configured to slide along the rail in the first direction; a knob coupled to the hinge to slide in the first direction and configured to detect a rotation input; and a magnet holder disposed to face the hinge in a second direction of the hinge and extending in the first direction; wherein the hinge is provided with a first magnet, the magnet holder is provided with a second magnet and a third magnet, the second and third magnets have different magnetic poles from that of the first magnet on facing surface thereagainst, the first magnet reacts by an magnetic force of the second or third magnets so that the knob is held to a first position or a second position respectively, a strength of the magnetic force between the first magnet and the second or third magnets is adjustable, wherein the first magnet is coupled to the hinge to be movable in the second direction.

The hinge may be provided with a female screw thread in the second direction, the first magnet may be provided on a male screw coupled to the female screw thread, and the strength of the magnetic force between the first magnet and the second or third magnets is adjusted according to a connection degree between the male screw and the female screw thread.

In accordance with another aspect of the disclosure, a user interface device includes a rail extending in a first direction; a hinge configured to slide along the rail in the first direction; a knob coupled to the hinge to slide in the first direction and configured to detect a rotation input; and a magnet holder disposed to face the hinge in a second direction of the hinge and extending in the first direction; wherein the hinge is provided with a first magnet, the magnet holder is provided with a second magnet and a third magnet, the second and third magnets have different magnetic poles from that of the first magnet on facing surface thereagainst, the first magnet reacts by an magnetic force of the second or third magnets so that the knob is held to a first position or a second position repectively, a strength of the magnetic force between the first magnet and the second or third magnets is adjustable, wherein the magnet holder comprises a plurality of magnet pairs including the second magnet and the third magnet each, a magnetic force of the second magnet and the third magnet included in each magnet pair is the same, the magnetic forces of the second magnets and the third magnets included in a different magnet pairs are different from each other.

The magnet holder may be configured to change a magnitude of the magnetic force applied to the first magnet of the hinge sliding by moving the position of the magnet pair.

The magnet holder may include four magnet pairs and has in the form of a rectangular prism with the first direction as a height and rotatable about the first direction, and the each magnet pair is provided on each side of the rectangular prism.

The magnet holder may further include a first driving device, the first driving device is configured to rotate the magnet holder about the first direction according to a user input.

The magnet holder may include n number of magnet pairs (n is a natural number greater than or equal to 3) and has n sides prism shape with the first direction as a height, the magnet holder provided with the magnet pairs on each side surface of the n sides prism one by one and provided to be rotatable in the first direction as an axis.

The plurality of the magnet pairs is arranged in a third direction perpendicular to the first and second directions, and the magnet holder is configured to be movable in the third direction.

The magnet holder may further include a second driving device, the second driving device is configured to move the magnet holder in the third direction according to a user input.

BRIEF DESCRIPTION OF THE DRAWINGS

These and/or other aspects of the disclosure will become apparent and more readily appreciated from the following description of the exemplary embodiments, taken in conjunction with the accompanying drawings, of which:

FIG. 1 is a schematic view illustrating a user interface device according to an embodiment of the disclosure;

FIG. 2 is a schematic view illustrating a configuration of a user interface device according to an embodiment of the disclosure;

FIG. 3 is a schematic view illustrating a magnetic force control structure of a user interface device according to a first embodiment of the disclosure;

FIG. 4 is a schematic view illustrating a magnetic force control structure of a user interface device according to a first embodiment of the disclosure;

FIG. 5 is a schematic view illustrating a magnetic force control structure of a user interface device according to a second embodiment of the disclosure; and FIG. 6 is a schematic view illustrating a magnetic force control structure of a user interface device according to a third embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a schematic view illustrating a user interface device according to an embodiment of the disclosure, and FIG. 2 is a schematic view illustrating a configuration of a user interface device according to an embodiment of the disclosure.

A user interface device 1000 may be provided on a center fascia of a vehicle to concisely provide driving environment information through a display 100, and at the same time, control an in-vehicle system through a physical manipulation method of a knob 200. The knob 200 may slidably move on a display surface of the display 100 and may detect a rotation input.

Referring to FIG. 2, the user interface device 1000 may include the display 100, a rail 280 provided to extend in a first direction (indicated by an arrow in FIG. 2) parallel to the display 100 on one side of the display 100, a hinge 300 sliding along the rail 280 in the first direction, the knob 200 coupled to the hinge 300 to slide in the first direction on the display surface of the display 100 and detect the rotation input, a magnet holder 400 disposed in a second direction of the hinge 300 opposite to the hinge 300 and extending in the first direction, and a hinge sensor 500 detecting a position of the hinge 300.

Meanwhile, as shown in FIG. 1, the user interface device 1000 may further include a case 150 in which the rail 280, the magnet holder 400, and the hinge sensor 500 are accommodated therein so as not to be exposed to the outside. The case 150 may be provided to cover an area close to the knob 200 in order to minimize the exposure of the hinge 300, and the hinge 300 may have a surface similar to the material of the display 100 so as not to be not easily noticeable on the display 100.

The display 100 may display information necessary for a user. For example, the display 100 may be a touch display device including a touch panel (not shown). The user may input information into the user interface device 1000 through such a touch panel or may input information through a manipulation of the knob 200.

The knob 200 may detect a rotation input by a user's manipulation. To this end, the knob 200 may include a knob body that rotates about a rotation axis. The knob 200 may include a hollow portion 290.

The knob 200 is coupled to the hinge 300, and the hinge 300 may slide along the rail 280 in the first direction. Accordingly, the knob 200 may also slide in the first direction. At this time, the knob 200 may slide on the display surface of the display 100.

On the other hand, the hinge sensor 500 detects a position of the hinge 300. Because the hinge sensor 500 detects the position of the hinge 300, the user may input information into the user interface device 1000 through the hinge sensor 500 by sliding the knob 200 coupled to the hinge 300 to move the position of the hinge 300.

Accordingly, the user may input information by touching the display surface of the display 100, or may input information by sliding or rotating the knob 200 positioned on the display surface.

On the other hand, the hinge 300 is provided with a first magnet 310, and the magnet holder 400 is provided with a second magnet 410, a third magnet 420 and a fourth magnet 430 facing against the first magnet 310 so that the magnets 410, 420 and 430 have different magnetic poles from that of the first magnet 310 on facing surfaces against. Accordingly, the first magnet 310 reacts by a magnetic force of the second magnet, the third magnet and the fourth magnet 410, 420 and 430, so that the knob 200 may be held to a first position, a second position, and a third position on the display surface of the display 100, respectively.

In other words, because an attractive force acts between the plurality of magnets 410, 420 and 430 and the first magnet 310 of the hinge 300, when the first magnet 310 of the hinge 300 is positioned at a position corresponding to each of the plurality of magnets 410, 420 and 430 of the magnet holder 400, the facing magnets may be held by an magnetic force.

In the case of that three magnets 410, 420 and 430 are provided in the magnet holder 400, the hinge 300 may be held at three positions corresponding to each magnet, and accordingly, the knob 200 coupled to the hinge 300 may also be held to three positions (a first position, a second position, and a third position) on the display surface of the display 100.

As such, a user may input information by sliding the knob 200 coupled to the hinge 300. At this time, the hinge 300 and the knob 200 may be held by the magnetic force between the first magnet 310 provided on the hinge 300 and the second to fourth magnets 410, 420 and 430 provided on the magnet holder 400 at a predetermined position, and the user may move the knob 200 from the predetermined position by holding the knob 200 and applying force. As the user grabs the held knob 200 to move closer to the first position, the knob 200 receives a force to move to the first position by the attractive force between the first magnet 310 of the hinge 300 and the second magnet 410 of the magnet holder 400.

Accordingly, the user may move the knob 200 to a vicinity of the first position without having to directly move the knob 200 to the first position.

On the other hand, to move the knob 200 from the first position to the second position, the user may grape the knob 200 and apply a force to move the knob 200 in a direction of the second position. At this time, in the vicinity of the first position, since the attractive force between the magnet 310 and the second magnet 410 is greater than the attractive force between the first magnet 310 and the third magnet 420, the knob 200 receives a resistive force to return to the first position. However, when the knob 200 is moved closer to the second position, the attractive force between the first magnet 310 and the third magnet 420 is greater than the attractive force between the first magnet 310 and the second magnet 410, so that the knob 200 receives a force to move to the second position.

The magnitude of the magnetic force between the first magnet 310 and the fourth magnets 410, 420 and 430, that is, a holding (or gripping) force of the knob 200 may be different for each user. Some users may feel that it is difficult to move the knob 200 because the holding force of the knob 200 is too large, and some users may feel that it is uncomfortable because the holding force of the knob 200 is too small and the force inducing the knob 200 to a predetermined position is weak. Accordingly, it is desirable that each user may adjust and use the holding force suitable for use in his/her own feeling.

Therefore, the user interface device 1000 according to an embodiment of the disclosure is provided such that a strength of the magnetic force between the second magnet 410, the third magnet 420, or the fourth magnet 430 and the first magnet 310 is adjustable.

Hereinafter, each embodiment for adjusting the strength of the magnetic force between the second magnet 410, the third magnet 420, or the fourth magnet 430 and the first magnet 310 will be described.

FIGS. 3 and 4 are schematic views illustrating a magnetic force adjustment structure of a user interface device according to a first embodiment of the disclosure.

FIGS. 3 and 4 show the structure of the user interface device 1000 according to the first embodiment of the disclosure.

In the first embodiment shown in FIGS. 3 and 4, the first magnet 310 may be coupled to be movable in the second direction in the hinge 300, that is, in a direction on which the magnet holder 400 is disposed. For example, the hinge 300 may be provided with a female screw thread 313 in the second direction, and the first magnet 310 may be provided with a male screw 315 coupled to the female screw thread 313. Because the male screw 315 is coupled to the female screw thread 313 through rotation, the user may rotate the male screw 315 to adjust a degree of connection with the female screw thread 313. The male screw 315 may move in the second direction according to the degree of connection with the female screw thread 313.

At this time, since the first magnet 310 is provided on the male screw 315, the first magnet 310 moves in the second direction according to the connection degree of the male screw 315 and the female screw thread 313, so that the distance between the first magnet 310 and the magnets 410, 420 and 430 of the magnet holder 400 is adjusted. Accordingly, the strength of the magnetic force between the first magnet 310 and the second magnet 410, the third magnet 420 or the fourth magnet 430 may be adjusted. At this time, because a screw head of the male screw 315 is exposed to the outside of the hinge 300, the user may directly adjust the holding force of the knob 200 by adjusting the connection degree of the male screw 315 and the female screw thread 313 through the screw head of the male screw 315.

FIG. 5 is a schematic view illustrating a magnetic force adjustment structure of a user interface device according to a second embodiment of the disclosure.

FIG. 5 shows the structure of the user interface device 1000 according to the second embodiment of the disclosure.

In the second embodiment, the magnet holder 400 may include a plurality of magnet pairs 440 including the second magnet 410, the third magnet 420 and the fourth magnet 430. In other words, one magnet pair 440 includes the second magnet 410, the third magnet 420 and the fourth magnet 430, and since such magnet pairs 440 are provided in plural, so that the magnet holder 400 may include the plurality of second magnets 410, third magnets 420 and fourth magnets 430.

At this time, the magnetic forces of the second magnet 410, the third magnet 420 and the fourth magnet 430 included in each magnet pair 440 may be the same, and the magnetic forces of the second magnet 410, the third magnet 420 and the fourth magnet 430 included in the different magnet pairs 440 may be different.

For example, the magnet holder 440 may include a magnet pair A 440a and a magnet pair B 440b. The magnet pair A 440a may include a second magnet A 410a, a third magnet A 420a and a fourth magnet A 430a, and the magnet pair B 440b may include a second magnet B 410b, a third magnet B 420b and a fourth magnet B 430b. At this time, the magnetic force of the second magnet A 410a, the third magnet A 420a and the fourth magnet A 430a included in the magnet pair A 440a may be the same. But, even with the same second magnets 410, the magnetic forces of the second magnet A 410a included in the magnet pair A 440a and the second magnet B 410b included in the magnet pair B 440b may be different.

As such, the magnet holder 400 including the plurality of magnet pairs 440 may change the magnitude of the magnetic force applied to the first magnet 310 of the hinge 300 sliding by moving the position of the magnet pair 440.

In the second embodiment shown in FIG. 5, the magnet holder 400 may include four magnet pairs 440. At this time, the magnet holder 400 has a rectangular prism shape 460 having a first direction as a height. Magnet pairs 440 are provided on each side surface of the rectangular prism 460 one by one, which may be rotated in the first direction as an axis.

As shown in FIG. 5, the magnet holder 400 has in the form of the rectangular prism 460 elongated in the first direction. The pair of magnets 440 may be provided one by one on each side surface of the rectangular prism 460, so each side surface may include the second magnet 410, the third magnet 420 and the fourth magnet 430 one by one. In FIG. 5, the magnet pair A 440a is provided on a first side surface of the rectangular prism 460, which is disposed to face the hinge 300, and thus the second magnet A 410a, the third magnet A 420a and the fourth magnet A 430a are disposed in the first side surface. Meanwhile, a second side surface adjacent to the first side surface is provided with the magnet pairs B 440 b, and thus the second magnet B 410b, the third magnet B 420b and the fourth magnet B 430b are disposed in the second side surface. A third side surface of the rectangular prism 460 is provided with the magnet pairs C 440c, and thus the second magnet C 410c, the third magnet C 420c and the fourth magnet C 430c are disposed in the third side surface. A fourth side surface of the rectangular prism 460 is provided with the magnet pairs D 440d, and thus the second magnet D 410*d*, the third magnet D 420*d* and the fourth magnet D 430*d* are disposed in the fourth side surface.

As described above, the magnetic forces of the magnets included in the different magnet pairs 440 are different. Accordingly, when arranging the magnet pair A 440*a* of the first side surface to face the first magnet and when arranging the magnet pair B 440*b* of the second side surface to face the first magnet, the magnitude of the attractive force applied between the first magnet 310 and the second to fourth magnets 410, 420 and 430 are different. Accordingly, the user may adjust the holding force of the knob 200 by rotating the rectangular prism 460 and selecting the magnet pair 440 disposed opposite to the hinge 300.

Similarly, the magnet holder 400 may include n number of magnet pairs 440 (n is a natural number greater than or equal to 3), have n sides prism shape with the first direction as a height, be provided with the magnet pairs 440 on each side surface of the n sides prism one by one, and be provided to be rotatable in the first direction as an axis.

In other words, the magnet holder 400 has a number of various sides, such as a triangular prism, a pentagonal prism, etc. in addition to the rectangular prism shown in FIG. 5, and may be implemented in the form of including a plurality of magnet pairs having different magnetic forces. As the number of sides of the prism increases and the number of magnet pairs increases, the holding force of the knob 200 may be more precisely adjusted.

On the other hand, the magnet holder 400 may include a first driving device 450. The first driving device 450 may rotate the magnet holder 400 in the first direction as an axis according to a user's input. In the case of the magnet holder 400 in the form of the rectangular prism 460 shown in FIG. 5, it may be difficult for the user to directly rotate the magnet holder 400 because it may be disposed on a back side of the display that is not exposed to the user. Accordingly, the first driving device 450 for rotating the magnet holder 400 according to the user's input may be included to allow the user to adjust the holding force of the knob 200.

FIG. 6 is a schematic view illustrating a magnetic force adjustment structure of a user interface device according to a third embodiment of the disclosure.

FIG. 6 shows the structure of the user interface device 1000 according to the third embodiment of the disclosure.

In the third embodiment, the magnet holder 400 may include the plurality of magnet pairs 440 including the second magnet 410, the third magnet 420 and the fourth magnet 430. In other words, one magnet pair 440 includes the second magnet 410, the third magnet 420 and the fourth magnet 430, and since such magnet pairs 440 are provided in plural, so that the magnet holder 400 may include the plurality of second magnets 410, third magnets 420 and fourth magnets 430.

At this time, the magnetic forces of the second magnet 410, the third magnet 420 and the fourth magnet 430 included in each magnet pair 440 may be the same, and the magnetic forces of the second magnet 410, the third magnet 420 and the fourth magnet 430 included in the different magnet pairs 440 may be different. This is the same as described above in the second embodiment.

As such, the magnet holder 400 including the plurality of magnet pairs 440 may change the magnitude of the magnetic force applied to the first magnet 310 of the sliding hinge 300 by moving the position of the magnet pair 440.

In the third embodiment shown in FIG. 6, the plurality of magnet pairs 440 may be arranged in a third direction perpendicular to the first and second directions. The magnet holder 400 enable to move in the third direction.

Referring to FIG. 6, the magnet holder 400 may be in the form of a panel 480 facing the hinge 300, and the plurality of magnet pairs 440 may be arranged on the panel 480. In the magnet pair 440, the second magnet 410, the third magnet 420 and the fourth magnet 430 may be arranged in the first direction, and the plurality of magnet pairs 440 may be arranged in the third direction. Herein, the first direction refers to a direction in which the rail extends and the hinge 300 and the knob 200 move, and the second direction refers to a direction in which the magnet holder 400 and the hinge 300 face each other. In other words, the plurality of magnet pairs 440 are arranged in the third direction perpendicular to the moving direction of the first magnet 310 of the hinge 300, and the magnet holder 400 is movable in the third direction.

In the third embodiment shown in FIG. 6, the magnet holder 400 may include the magnet pair A 440*a* and the magnet pair B 440*b*. The two magnet pairs 440 are arranged in the third direction on the panel 480. In FIG. 6, the first magnet 310 of the hinge 300 is positioned at a position corresponding to the third magnet B 420*b* of the magnet pair B 440*b*. Since the hinge 300 slides in the first direction, the first magnet 310 slides at a position in the third direction corresponding to the magnet pair B 440*b*, thereby moving between positions corresponding to the second magnet B 410*b*, the third magnet B 420*b* and the fourth magnet B 430*b*. At this time, the user feels the holding force of the knob 200 by the magnetic force between the second magnet B 410*b*, the third magnet B 420*b*, and the fourth magnet B 430*b* and the first magnet 310.

When the panel 480 of the magnet holder 400 moves in the third direction, the magnet pair A 440*a* may move to the position where the magnet pair B 440*b* is currently positioned. In this case, the first magnet 310 of the hinge 300 is positioned at a position corresponding to the third magnet A 420*a* of the magnet pair A 440*a*. As a result, the first magnet 310 slides in the position of the third direction corresponding to the magnet pair A 440*a* to move between positions corresponding to the second magnet A 410*a*, the third magnet A 420*a* and the fourth magnet A 430*a*. At this time, the user feels the holding force of the knob 200 by the magnetic force between the second magnet A 410*a*, the third magnet A 420*a* and the fourth magnet A 430*a* and the first magnet 310. At this time, since the magnetic force of the magnets of the magnet pair A 440*a* and the magnetic force of the magnets of the magnet pair B 440*b* are different, the movement of the panel 480 of the magnet holder 400 in the third direction cause the user to feel the change in the holing force of the knob 200. Accordingly, the user may adjust the holding force of the knob 200 by moving the panel 480 of the magnet holder 400.

FIG. 6 shows an embodiment in which two magnet pairs 440 are provided, but the present disclosure is not limited thereto, and three or more magnet pairs 400 may be provided in the magnet holder 400. At this time, the magnetic forces of the magnets included in the three or more magnet pairs 400 may be different from each other, and thus the user may more precisely adjust the holding force of the knob 200.

On the other hand, the magnet holder 400 may include a second driving device 470. The second driving device 470 may move the magnet holder 400 in the third direction according to the user's input. In the case of the magnet holder 400 in the form of the panel 480 shown in FIG. 6, it may be difficult for a user to directly move the magnet holder because it may be disposed on the back side of the display that is not exposed to the user. Accordingly, the second driving device 470 for moving the magnet holder 400 according to the user's input may be included to allow the user to adjust the holding force of the knob 200.

The second driving device 470 includes a pinion gear 471, and the pinion gear 471 may rotate by receiving rotational power. The pinion gear 471 may be meshed with a rack gear 472. The panel 480 may be connected to the rack gear 472 to move together. The rotational power of the second driving device 470 may be converted into linear motion of the panel 480 through the pinion gear 471 and the rack gear 472 meshed therewith.

As is apparent from the above, the user interface device 1000 according to the above embodiments of the disclosure may hold (or grip) the knob 200 that slides using a magnet to a predetermined position, and adjust the holding (or gripping) force for holding the knob 200 by adjusting the magnetic force of the magnet.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface device, comprising:
a rail extending in a first direction;
a hinge configured to slide along the rail in the first direction;
a knob coupled to the hinge to slide in the first direction and configured to detect a rotation input; and
a magnet holder disposed to face the hinge in a second direction of the hinge and extending in the first direction;
wherein the hinge is provided with a first magnet,
the magnet holder is provided with a second magnet and a third magnet facing the first magnet, a surface of the second and the third magnets facing the first magnet have magnetic poles opposite to a magnetic pole of a surface of the first magnet facing the second and the third magnets,
the first magnet reacts to a magnetic force of the second or third magnets so that the knob is held to a first position or a second position respectively, and
a strength of the magnetic force between the first magnet and the second or third magnets is adjustable,
wherein the first magnet is coupled to the hinge to be movable in the second direction.

2. The user interface device of claim 1, wherein the hinge is provided with a female screw thread in the second direction,
the first magnet is provided on a male screw coupled to the female screw thread, and
the strength of the magnetic force between the first magnet and the second or third magnets is adjusted according to a connection degree between the male screw and the female screw thread.

3. A user interface device, comprising:
a rail extending in a first direction;
a hinge configured to slide along the rail in the first direction;
a knob coupled to the hinge to slide in the first direction and configured to detect a rotation input; and
a magnet holder disposed to face the hinge in a second direction of the hinge and extending in the first direction;
wherein the hinge is provided with a first magnet,
the magnet holder is provided with a second magnet and a third magnet facing the first magnet, a surface of the second and the third magnets facing the first magnet have magnetic poles opposite to a magnetic pole of a surface of the first magnet facing the second and the third magnets,
the first magnet reacts to a magnetic force of the second or third magnets so that the knob is held to a first position or a second position respectively, and
a strength of the magnetic force between the first magnet and the second or third magnets is adjustable,
wherein each of the second magnet and the third magnet is provided in a plurality, such that the magnet holder comprises a plurality of magnet pairs including one second magnet and one third magnet each,
the second magnet and the third magnet included in the same magnet pair have the same magnetic force, and
the second magnet and the third magnet in different magnet pairs have different magnetic forces.

4. The user interface device of claim 3, wherein the magnet holder is configured to change a magnitude of the magnetic force applied to the first magnet of the hinge sliding by moving the position of the plurality of magnet pairs.

5. The user interface device of claim 4, wherein the number of the plurality of magnet pairs is four and the magnet holder has the form of a rectangular prism with the first direction as a height and rotatable about the first direction, and
each magnet pair is provided on each side of the rectangular prism.

6. The user interface device of claim 5, wherein the magnet holder further includes a driving device,
the driving device is configured to rotate the magnet holder about the first direction according to a user input.

7. The user interface device of claim 4, wherein the magnet holder includes n number of magnet pairs (n is a natural number greater than or equal to 3) and has n sides prism shape with the first direction as a height, the magnet holder provided with the magnet pairs on each side surface of the n sides prism one by one and provided to be rotatable in the first direction as an axis.

8. The user interface device of claim 4, wherein the plurality of the magnet pairs is arranged in a third direction perpendicular to the first and second directions, and
the magnet holder is configured to be movable in the third direction.

9. The user interface device of claim 8, wherein the magnet holder further includes a driving device,
the driving device is configured to move the magnet holder in the third direction according to a user input.

* * * * *